Jan. 16, 1962 W. H. TAYLOR 3,016,548
TWO PART GLASS WINDSHIELD TO REST ON A CROWNED BOAT DECK
Filed Sept. 15, 1958 3 Sheets-Sheet 1

INVENTOR
WILLARD H. TAYLOR
BY
John W. Hoag.
ATTORNEY

Jan. 16, 1962 W. H. TAYLOR 3,016,548
TWO PART GLASS WINDSHIELD TO REST ON A CROWNED BOAT DECK
Filed Sept. 15, 1958 3 Sheets-Sheet 2
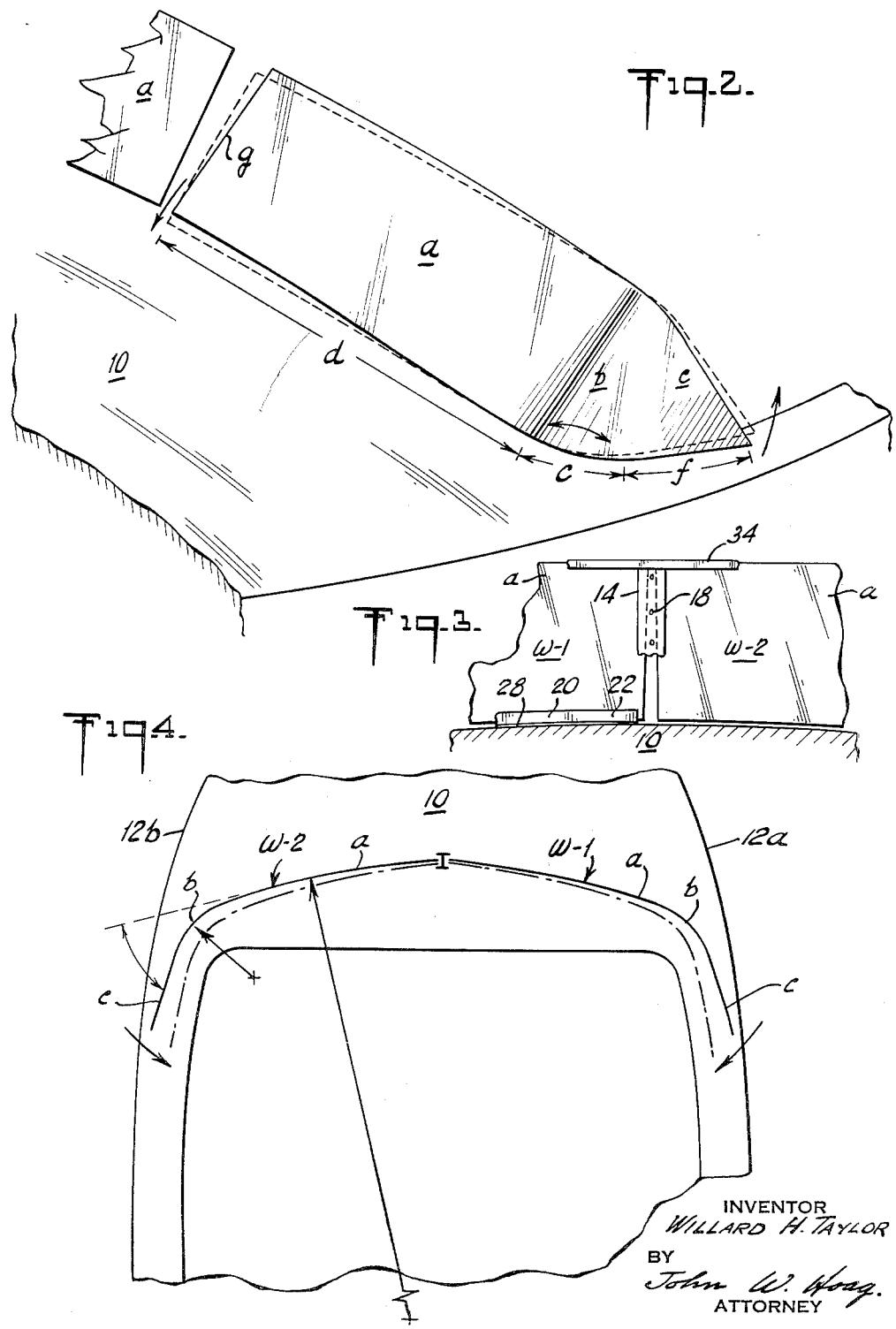
INVENTOR
WILLARD H. TAYLOR
BY
John W. Hoag.
ATTORNEY Jan. 16, 1962 W. H. TAYLOR 3,016,548
TWO PART GLASS WINDSHIELD TO REST ON A CROWNED BOAT DECK
Filed Sept. 15, 1958 3 Sheets-Sheet 3

INVENTOR
WILLARD H. TAYLOR
BY
ATTORNEY

United States Patent Office 3,016,548
Patented Jan. 16, 1962

3,016,548
TWO PART GLASS WINDSHIELD TO REST ON A CROWNED BOAT DECK
Willard H. Taylor, Gloversville, N.Y., assignor to Nelson A. Taylor Co., Inc., Gloversville, N.Y., a corporation of New York
Filed Sept. 15, 1958, Ser. No. 761,233
3 Claims. (Cl. 9—1)

This invention relates to a wrap-around windshield construction employing glass or other rigid transparent material adapted to be mounted across the deck of a motor boat and secured in place by means other than a fixed frame such as is usually built into motor cars and some boats.

Application of such windshield structures is particularly contemplated for the decks of small sport boats, of the kind employing outboard or inboard motors, and varying in chord width within a range of approximately 54 to 82 inches.

Heretofore unitary windshields of flexible and bendable plastic have been provided for such boats. The advantages of using a glass windshield have been recognized. These include the greater resistance of glass to scratches, and its greater suitability for use with a windshield wiper, and its greater strength and durability. But such windshields have not heretofore been available because of the expense of having such a windshield custom made, and the difficulty of fitting a rigid windshield to a boat deck unless the shield is custom made. This difficulty arises from the fact that there is no standard relation between the chord width of a deck and the extent of its "crowning" or camber.

It is an object of this invention to provide a windshield construction of the wrap-around type employing glass or other rigid material by which the above mentioned difficulties may be overcome.

Another object of the invention is to provide improved means for securing a windshield to a boat deck.

Another object of the invention is to provide improved means for interconnecting the inner ends of two rigid windshield halves with their abutting edges in adjusted angular relation.

Other objects of the invention will be apparent from the following disclosure. The invention will best be understood if read in connection with the accompanying drawings in which, FIGURE 1 is a perspective view showing a structure embodying my invention applied to a boat deck.

FIGURE 3 is a front elevation showing the center part of the structure after the butt edges of the two halves have been clamped together.

FIGURE 4 is a top plan view illustrating diagrammatically how the glass windshield halves are swung around their opposed butt edges to position the halves more or less diagonally across the deck thereby changing the extent of curvature along the line contacted by the lower edge of the halves respectively.

FIGURE 8 is a perspective view, partly in cross section, showing a modified form of sealing strip for the lower edge of the windshield halves, and co-acting means for fastening to a boat deck.

Figure 1:
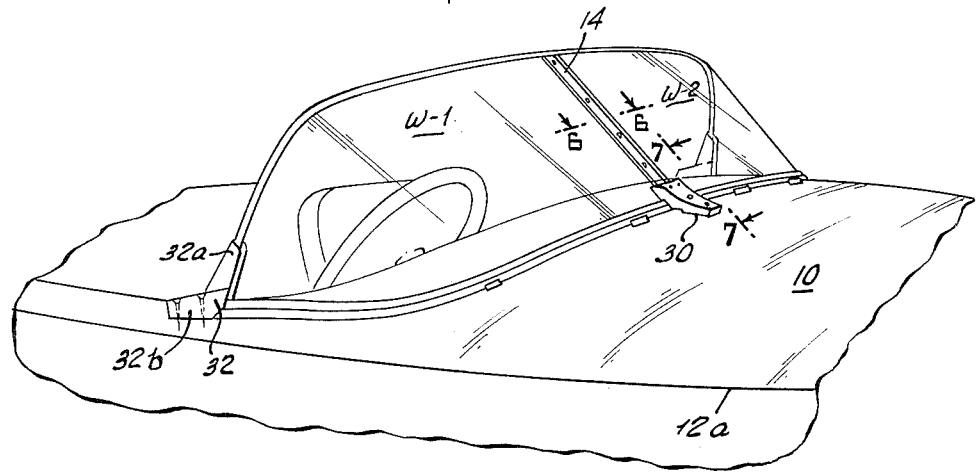

In boats to which windshield structures embodying my invention are applied the boat deck 10 is "crowned," i.e., it has a camber, being highest at its longitudinal mid-line 13 and curving gradually upwardly to its said mid-line from its lateral margins 12a and 12b respectively but there is no standard relation between the camber of a deck and its chord width. The chord width of the deck is the length of a straight line between opposed points on said lateral margins, taken in a transverse vertical plane normal to the longitudinal mid-line of the deck, and is represented by the line $x$ in FIGURE 5. The camber or extent of crowning is the height $z$ of the deck surface at its mid-line above the mid-point $y$ of line $x$. Between decks differing in chord width by about 4 inches, the height of the deck surface above the midpoint $y$ of a line $x$ representing the chord width of the deck may vary within a range of approximately 1 to 4 inches.

Since boats of the kind for which my windshields are intended are not made according to standard, and there is no standard relation between the extent of crowning and the chord width of the boat decks, it would be entirely impractical and prohibitively expensive to custom make a one piece glass windshield for each boat deck. By my invention I have provided a windshield structure using glass or other equivalent rigid material, which does not need to be custom made for a particular deck. Instead it may be provided in a few standard sizes each of which may be fitted to the camber of any deck the chord width of which is within a limited range of chord width variations. Thus I am able to provide a ready made windshield which may be selected and satisfactorily fitted to any boat deck of the kind contemplated. That is to say, I provide a limited number of standard adjustable windshield assemblies, say for example in seven sizes differing from one another in lengths by increments of approximately 4 inches, and with these few standard sizes I can fit the deck of any boat the chord width of which is within the said range of 54–82 inches. A windshield assembly of the kind disclosed herein, of any of said standard sizes, may be used on boat decks differing in chord width within a range of 4 inches, i.e., plus or minus 2 inches the standard size and may be adjusted to satisfactorily compensate for all camber variations which ordinarily occur between boat decks differing in chord width within said range of 4 inches.

The drawings are illustrative of any one of the standard sizes of windshield assemblies and show how any size of assembly may be adjusted to fit any boat deck within the range of camber and chord width dimensions for which the size is intended.

The illustrated assembly comprises the transparent windshield halves $w$–1 and $w$–2 made of glass or equivalent rigid material, the clamp means 14, 16 and 18 for interconnecting the windshield halves $w$–1 and $w$–2 in adjusted angular relation transversely of a boat deck, a bottom edge sealing strip 20, the center fastening means 30 which interengages and co-acts with said clamp means, and the end support brackets 32.

The windshield assembly may be secured to the boat deck by the center fastener means 30 and the end support brackets 32. However, other fastener means, such for example as the particular fastener means 64 shown in FIGURE 8 in co-action with a special form of sealing strip, may be used at spaced intervals along the sealing strip to secure the forwardly projecting portion of the strip to the deck and thus also provide additional fastening means for the windshield.

It is desirable to finish the top edge of the windshield by press fitting a U-shaped chrome molding strip 34 over it, as is common practice.

Figure 2:
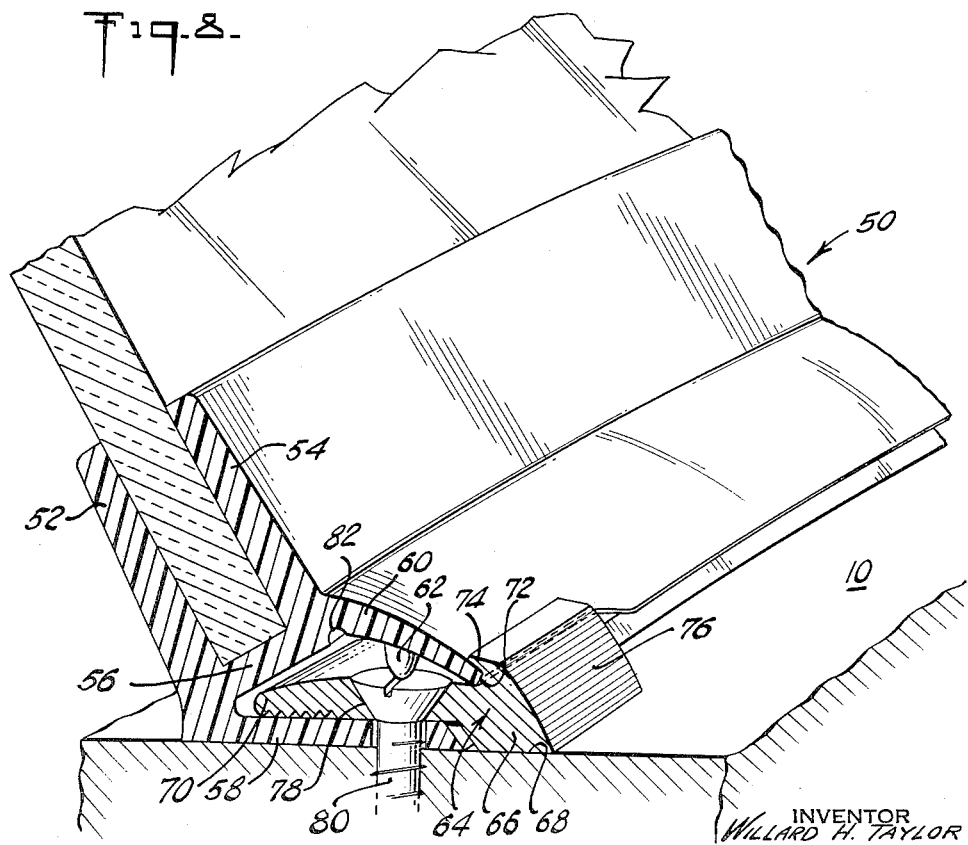
FIGURE 2 is a schematic perspective view illustrating how the two rigid halves of a glass portion of a structure may each be rocked in the plane of the portion $a$ to bring the opposed butt edges of the halves into substantially parallel relation.

The windshield halves w-1 and 2—2 each comprise (FIG. 2) a main portion a, and an end portion c bent rearwardly, preferably through an angle of approximately 80 degrees relative to the plane of main portion a, and thus extending outwardly as well as rearwardly on the boat deck, and an intermediate curved portion b. The main portion a of each windshield half of all said seven sizes of windshields, are curved longitudinally on a radius which is approximately of from 8 to 13 feet, and the portion b of each half of all said seven sizes of windshields is curved longitudinally on a radius which is approximately of from 8 to 12 inches, leaving the end portion c longitudinally straight. The portion c will then extend rearwardly at an angle of approximately 80 degrees with respect to the plane of portion a. I have found that for all of said sizes the length of portions b and c may be the same, the difference in length between the different standard sizes of assembly being accomplished by changing only the length of portion a of each half. To provide a plurality of two part windshield structures differing in maximum lengths by increments of 4 inches, it is only necessary to extend each half two inches for each longer size. As described in co-pending application Serial No. 759,523, filed September 8, 1958, this may be accomplished without multiplication of forming molds by using a mold one end of which is movable to control the length of the portion a of a windshield half being formed.

Of course two part windshield models differing in height as well as in maximum length may be provided but this is not necessary.

I make the lower edges d of the half windshield portions a substantially normal longitudinally to the inner end edges g of the halves but taper the lower edges f of portions c so that when placed on the deck and extending across the deck each half assumes a rearwardly tilted and thus streamlined position. Some tilting of the windshield halves would occur even if the lower edge f of each portion c was a straight line continuation of edge portion d, due to the falling away of the deck under the rearwardly and outwardly angled ends of the windshield. However, the inward tilting or streamlining which would be obtained would be very slight and in order to increase the tilting of the windshield assembly in its adjusted position on the boat deck I taper the lower edges f of the outer end portions c sufficiently so that each half when placed on the boat deck is inclined at an angle of approximately 135° with respect to the deck surface in front of the windshield.

Figure 7:
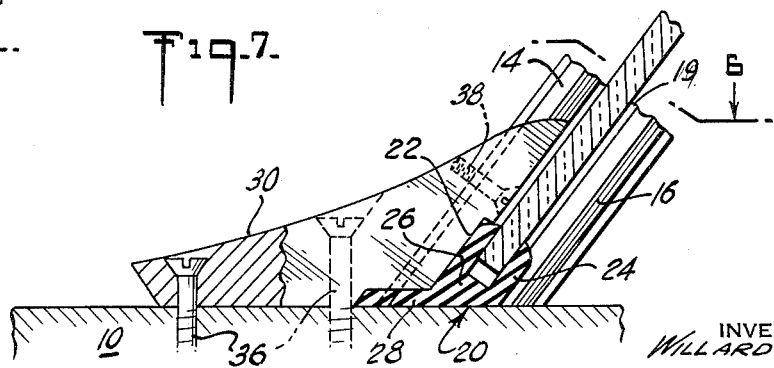
FIGURE 7 is a side elevation, partly in section of the structure shown in FIGURE 6, and is taken on the line 7—7 of FIGURE 1 and of FIGURE 6.

When first positioned across the boat deck each half will usually rest upon the lower edge portion f of its end portion c, the lower endges d will be spaced from the deck and inclined upwardly toward the inner end edges g, and the opposed inner edges g will be angularly related in a vertical plane. The space between edges d and the deck is at least partially filled by the sealing strip 20 (FIGURE 7) which may be of any known kind having the upwardly extending lips 22 and 24 spaced apart to receive the lower edge of the windshield halves and frictionally engage their front and rear surfaces, the intermediate or web portion 26, and the portion 28 extending forwardly on the boat deck. However, by rocking each half individually in the plane of portion a the opposed butt edges g of the halves are brought into substantially parallel relation and they then are loosely interconnected by the clamp means 14, 16 and 18 after the center fastener means 30 has been mounted on the boat deck at its mid-line as by screws 36 and interengaged with the front clamp bar 14 as by screw means 38.

Members 14 and 16 are interchangeable strips which extend over opposite faces of the halves and are interconnected centrally by the bolts 18. Each strip has the longitudinally extending ribs r disposed on opposite sides of its longitudinal center line, the ribs r on one strip being respectively opposed to the ribs r on the other strip, and when in use being spaced from the ribs of the other strip by a distance less than the thickness of the windshield halves, the two strips thus co-acting to form stop means establishing a minimum distance between the inner edges of the halves and providing a space between the halves centrally of the strip. The strips 14 and 16 are extended laterally beyond ribs r to provide oppositely opening spaces of sufficient depth to allow the opposed edges g of the adjusted halves to be disposed in parallel relation, or within a range of angular relationships departing from the exact parallel relation. It will be understood that the said clamp members 14—16 are adapted to extend over the inner and outer surfaces of the windshield parts sufficiently to permit the angular relation of the parts to be adjusted by double rotation both in a substantially vertical plane and in a horizontal plane.

Figure 6:
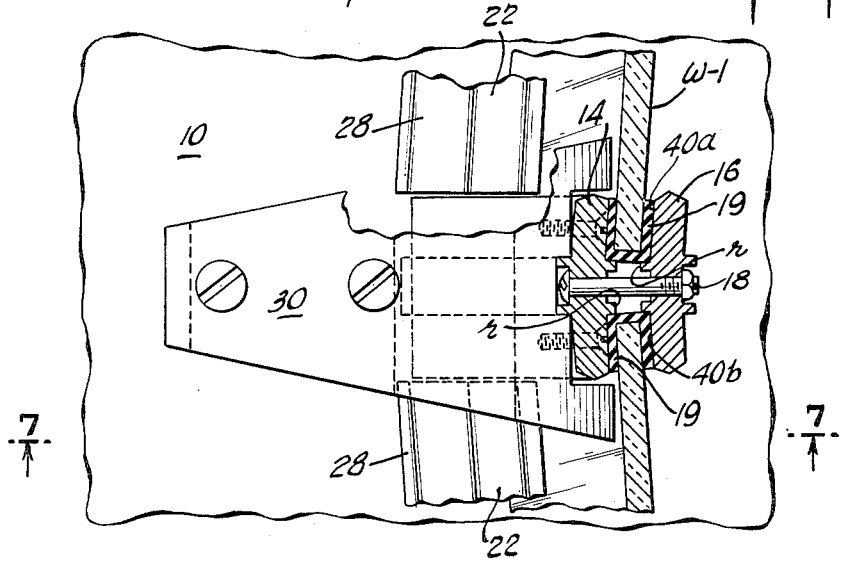
FIGURE 6 is a plan detail view partly in section taken on the line 6—6 of FIGURE 1 and of FIGURE 7.

As best shown in FIGURE 6, U-shaped gaskets or interlinings 19 are provided around the inner opposed ends of the windshield halves which are between the clamp members 14 and 16, and the sealing strip 20 extends over the lower edges of w-1 and w-2 from the end brackets 32 to the clamp members 14 and 16.

Figure 5:
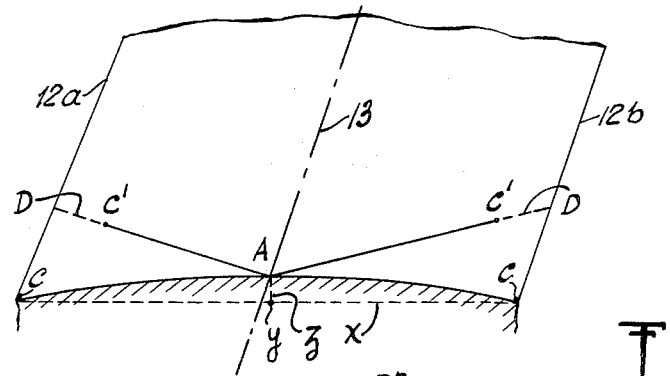
FIGURE 5 is a view showing diagrammatically the curved surface of a boat deck, and its chord width and illustrating how, as the outer end of a windshield half is moved inwardly toward the center line of the deck the difference in elevation between its inner and outer ends, along its lower edge is decreased.

When a windshield assembly has been adjusted to a boat deck the two halves w-1 and w-2 will not necessarily be longitudinally aligned. Instead they will usually form an angle with the clamp means 14, 16 at the apex of the angle, indicated as A in FIGURE 5. By swinging the halves rearwardly on a boat deck, around A as indicated in FIGURE 5, their outer extremities, indicated as C—C in FIGURE 5, are also moved inwardly toward the longitudinal center line of the deck, indicated as 13 in FIGURE 5, and the overall length of the windshield assembly is lessened, i.e., the straight line distance between $C^1$—$C^1$ is less than the distance between C—C. The relative angular disposition of the windshield halves affects the fit of the lower edges of the halves to the deck. The further the outer ends of the halves are from the lateral margins 12a and 12b of the deck the less is the difference in elevation of the deck surface between the inner and outer ends of each half. The broken lines D—D indicate the distance the angularly related lines A—$C^1$ would have to be extended for the deck to fall away as much along said lines as it falls away along the aligned lines A—C. So the greater the camber the more the outer ends of the halves are swung in to compensate, and fit, the bottom edges of the halves to the curvature of the deck, and vice versa.

By a combination of rocking the halves in the plane of their portions a respectively and swinging the outer ends of the halves toward and away from the said center line of the deck, halves having portions a and b curved within the ranges of curvature specified above are readily manipulated into the position in which they are best fitted to the camber of the deck. The windshield halves are rocked on their curved lower edges and the said halves are swung around their inner butt edges, respectively.

When the angular relation of the windshield halves has been adjusted the assembly of clamp members 14 and 16 is completed and the wing brackets 32 are secured in position to engage the extremities of portions c respectively of the halves w-1 and w-2.

The end brackets 32 (FIG. 1) may be of known kind and each comprises an upwardly extending portion 32a, which comprises spaced parallel arms between which the outer end of the portion c of a windshield half is received, and a base portion 32b for attachment to the deck 10 to retain the half, w-1 or w-2, in its adjusted position. The bottom edge sealing strip, 20 of FIGURE 7 or 50 of FIGURE 8, should be trimmed to abut against, or run slightly into, the portions 32a of the wing brackets. If intermediate fastener clamps, in addition to 30, are employed, for example on the larger windshield models, it is desirable that they be installed in front of the curved portions b of the halves respectively.

In FIGURE 8 is shown a preferred sealing strip 50 for the lower edge of the halves w–1 and w–2. It is essentially an H-member. It comprises the lips 52 and 54 which project upwardly from the transverse web portion 56 and are spaced apart to receive and engage between them the lower edge portion of the windshield halves. Projecting forwardly from web 56 is the extension strip 58 which lies flat on the deck surface, and the flap strip 60, which is spaced above strip 58 and angularly related to it for the purpose of covering it, and any fastening means 64 by which strip 58 may be secured to the boat deck, as for example at spaced intervals on either side of clamp member 14.

As shown in FIGURE 8 each fastener means 64 comprises, a forward portion 66 having a lower face 68 adapted to rest on the boat deck, an arm 70 which is superimposed on the extension strip portion 58 of member 50, and a recess or groove 72 provided above said arm 70 to receive the lower end of the flap portion 60, the recess 72 being partly defined by the lip 74 projecting from portion 66 above arm 70 and acting as holddown for flap 60.

After the arm 70 has been superimposed upon the strip 58 a screw 80 is inserted through the screw hole 78 into the deck. In order that the lower edge of arm 70 may more positively engage the strip 58 its lower edge may be serrated as shown in FIGURE 8. A small reentry groove 82 is shown at the base of flap 60 where it joins the web 56, the purpose of groove 82 being to make the flap 60 more readily bendable around its base line to facilitate lifting it to give access to the space between it and the strip extension 58, for positioning the fastener arm 70 on top of extension strip 58 and for the insertion of screw means 80 in the screw hole 78 of arm 40.

The lip 74 forms the upper part of the outer face of the forward portion 66 of each fastener means 64, and from the base of the lip the outer face portion 76 slopes downwardly, its inclination being such that it substantially continues the inclination of flap 60 when the free end of flap 60 is engaged under lip 74. In order to provide and keep the pleasing curved line of flap 60, which is continued by the outer face portion 76 of each fastener, a rib 62 is provided on the under surface of the flap 60 intermediate its inner and outer edges. Rib 62 serves to prevent collapsing of flap 60 intermediate its outer and inner edges by providing support when it comes into contact with the upper surface of extension strip 58.

In accordance with the invention disclosed herein a limited number of standard "sizes" of windshield assemblies may be made to serve the needs of all boats of the kind for which these assemblies are intended. The "sizes" may differ only in the length of portion a of w–1 and w–2. The size designation may indicate the maximum length of an assembly if the halves are disposed with their portions a in alignment, but the distance between the outer ends of the halves may be decreased as described to fit the individual camber of a deck.

The windshield structure disclosed herein has the advantage that it permits purchasers to select a standard assembly using glass or other rigid transparent material, and fit it to the camber of any deck which is within a stated range of chord width variations for which the particular size of assembly is offered. It makes possible the use of glass wrap-around windshields on boats of the kind described whereas it has heretofore been considered that only a flexible and bendable plastic could be used.

There has thus been disclosed an embodiment of the invention in which the above stated objects are accomplished in a thoroughly practical way.

What I claim is:

1. The method of fitting a wrap-around windshield across a deck of any one of a number of boats differing in chord width and camber, which comprises, taking a wrap-around windshield which is divided into two halves each having an outer end angled rearwardly, a butt inner edge, and a lower edge which is substantially straight adjacent its butt end and curves upwardly adjacent its outer end, and disposing the windshield halves across a boat deck with their butt inner edges in substantially abutting relation, rocking the windshield halves on their curved lower edges in the plane of the windshield while swinging the halves horizontally around their inner butt edges respectively, and clamping the inner butt edges of the halves together when the combined rocking and swinging action brings the halves most nearly into contact with the deck along their entire lower edges.

2. A glass windshield of the wrap-around type for assembly on a crowned deck which comprises, two glass windshield parts, each having a butt inner end and an outer end portion bent rearwardly, each part having a lower edge which is substantially straight adjacent its butt end and is curved upwardly adjacent its outer end, and a clamp for locking the windshield parts together in a selected relative position of the parts relative to one another both vertically and horizontally, said clamp comprising members adapted to extend over the inner and outer surfaces of the parts sufficiently to permit the angular relation of the parts to be adjusted by double rotation both in a substantially vertical plane and in a horizontal plane, and cross bolts extending between the clamp members in the space between the opposed butt ends of the windshield parts.

3. The windshield described in claim 2 in which the clamp members having inwardly extending flanges which project into the space between the butt ends of the windshield parts and determine the minimum spacing between the inner butt edges of the parts relative to one another and provide a space between the ends of the parts through which said bolts extend.

References Cited in the file of this patent
UNITED STATES PATENTS

| | | |
|---|---|---|
| 1,562,337 | Kelsch | Nov. 17, 1925 |
| 2,102,123 | Leveau | Dec. 14, 1937 |
| 2,308,109 | Rundquist | Jan. 12, 1943 |
| 2,817,559 | Nickles | Dec. 24, 1957 |
| 2,937,652 | Zimmer | May 24, 1960 |

FOREIGN PATENTS

| | | |
|---|---|---|
| 476,239 | Great Britain | Dec. 6, 1937 |